Nov. 29, 1938.    O. E. ROBERTS, JR    2,138,122
PROCESS FOR THE SYNTHESIS OF AMMONIA
Filed May 21, 1935
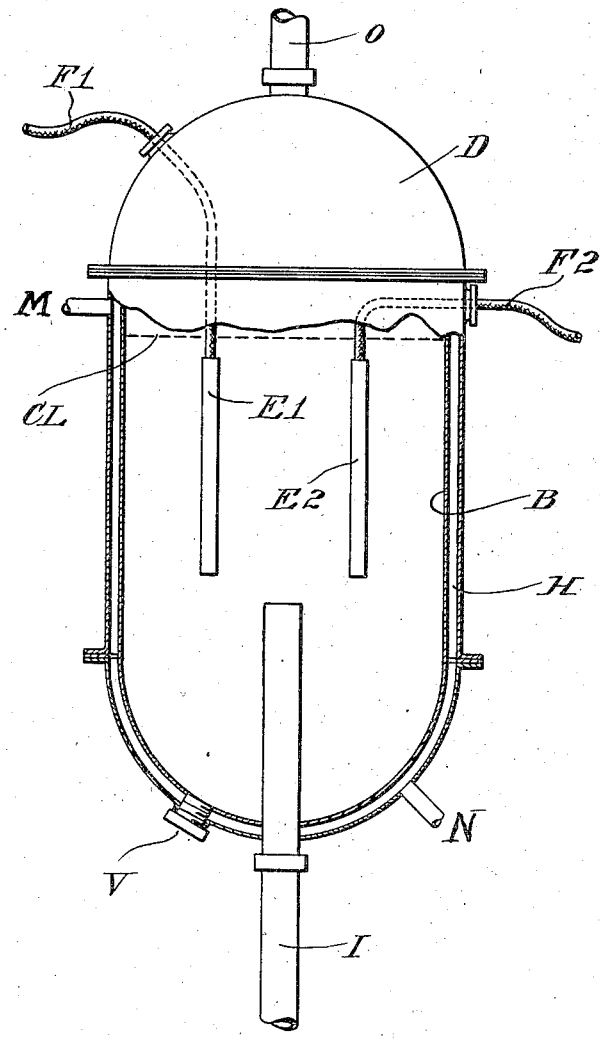

Patented Nov. 29, 1938

2,138,122

UNITED STATES PATENT OFFICE 2,138,122

PROCESS FOR THE SYNTHESIS OF AMMONIA

Ovid E. Roberts, Jr., Washington, D. C.

Application May 21, 1935, Serial No. 22,647

9 Claims. (Cl. 204—19)

My invention relates to a new and useful improvement in the art of combining nitrogen and hydrogen for the purpose of making anhydrous ammonia.

I have found that by the use of metallic potassium under the conditions I shall describe, most of the problems of catalyst poisoning are obviated and a more efficient reaction is produced under better operating conditions.

It is the practice in the industry to utilize small quantities of the oxides of aluminum and potassium in connection with a somewhat porous anhydrous iron as a catalyst. This iron may be rendered relatively inactive as by a number of contaminating substances of which moisture, sulfur oxides, and carbon monoxide may be cited as examples.

I have found that it is possible not only to increase the efficiency of the reaction involved in the synthesis of ammonia, but to do away with the necessity for frequently changing the catalyst, as necessitated by the poisoning experienced in the industry under present operating conditions. I have also found that the use of metallic potassium under the conditions I have described effects a saving in the cost of production of nitrogen for the synthesis, although this saving is not a very great cost factor.

For the purpose of explanation, I submit herewith a drawing in which is shown a diagrammatic view in sectional elevation of a reacting vessel designed in two parts, a body B and dome D. This reaction vessel is for the purpose of illustration, and I do not limit myself by my description to operations in a vessel of this type.

Within the reaction vessel shown I have indicated two electrodes E—1 and E—2 connected to electric terminals F—1 and F—2. These are the leads to a suitable power source.

The electrodes E—1 and E—2 are practically immersed in caustic potash. The level of the caustic is shown as C.L. Below the electrodes is shown an inlet I. This inlet is so placed that the incoming gases sweep upward between the electrodes, causing a flow of caustic within the vessel. This motion of the caustic keeps the metallic potassium produced by the electrolytic dissociation of the caustic from collecting and keeps a relatively uniform suspension and/or solution throughout this medium. The effect of this circulation promotes a more efficient reaction and also has the effect of cutting down the current consumption by mechanically assisting in the migration of the potassium ion produced by the electrolysis of the caustic.

In the diagram a temperature control zone is shown as H, formed between the inner and outer walls of B. The outlet for the ammonia so formed is indicated as O. M and N indicate piping connections to H for circulation of a medium for temperature control.

I have found that when fluid or molten potassium is exposed to an atmosphere of nitrogen there is formed a varying but appreciable amount of potassium nitride. Whether this nitride is that which we know as $K_3N$, or is represented by some other formula, I do not know. It is possible that there is produced a mixture of nitrogen-potassium compounds. Whatever the nature of the combination may be, there is formed a compound which is produced by the union of potassium and nitrogen. Such a compound with a relatively low stability may then be reduced by a stream of hydrogen with the formations of ammonia

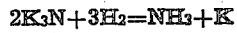
$$2K_3N + 3H_2 = NH_3 + K$$

By alternating the injection of nitrogen with that of hydrogen, the formation of ammonia may be effected. By its reaction with potassium, excess hydrogen forms the hydride, KH. It appears that when nitrogen is introduced, the following reaction occurs:

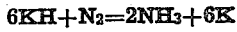
$$6KH + N_2 = 2NH_3 + 6K$$

I have found it possible by utilizing the principle of circulating the potassium-caustic solution-suspension to flow the nitride suspension toward another area of the reaction vessel and therein carry out the reduction simultaneously with the nitride formation in the electrode zone.

I do not limit my invention to the particular operating conditions herein set forth as a number of variations of such conditions are obvious.

In preparing the caustic for the injection of nitrogen, it is desirable to allow the electrolytic action to proceed to the point where there is actually free potassium in suspension in the caustic. The amount of metal so present will vary with operating conditions of which temperature and pressure may be cited as examples. Atmospheric pressure, or pressures slightly in excess thereof, may be used.

I do not limit myself to any exact temperatures or pressures. A temperature above 400° appears essential. The synthesis of ammonia is promoted by the use of pressure.

The arrangement of the anode and cathode may also be varied to give a more even contacting and circulation effect. The arrangement shown is for the purpose of description solely. A nickel or other screen may also be used between anode and cathode for the purpose of preventing the free potassium from collecting at the anode.

From the reaction involved it will be obvious that the necessity for forming fresh potassium will vary with the oxygen content of the gases reacted as well as with the other gaseous diluents. This replenishment of the potassium content of the caustic may be effected as desired. If it so happens that the catalyst-caustic becomes fouled by contaminating or poisonous substances, it is possible to withdraw the molten catalyst without interruption of the reaction. This is not possible with catalysts now in use. The catalyst withdrawn may be replaced in part or completely, as conditions make desirable.

The potassium solution-suspension offers a highly efficient means of removing the usual diluents of hydrogen which act as poisons to the usual catalysts. Sulfur present in the form of sulfides and oxides is readily removed. Carbon dioxide and carbon monoxide, also traces of oxygen in the nitrogen used, are likewise removed.

The metallic solution-suspension of an alkali metal in a caustic mixture may be used to remove oxygen from nitrogen, and may be used to remove carbon dioxide and carbon monoxide from hydrogen.

It will be evident that the production of alkali metals by electrolysis may be improved by assisting the migration of alkali metal ion from the electrode at which it is formed by the gaseous flow of nitrogen and/or hydrogen; the invention thus contemplates an improved process of producing alkali metals by electrolysis.

The input of current necessary to maintain a sufficient amount of potassium in suspension may be automatically controlled by electrical resistance as gauged by the electrolytic requirements.

I find that an excess of 3% metal in suspension appears desirable. The operation of more than one cell in series may also give a higher efficiency.

The use of sodium, potassium or other alkali metals in such caustic suspensions, is within the scope of my invention.

I may use certain admixtures of gaseous hydrocarbons with hydrogen with the resultant formation of certain amines, and/or nitrogenous compounds. Unsaturated hydrocarbons (such as olefines or naphthenes), preferably in the presence of hydrogen, may be used.

In the appended claims, the term "solution" is used as comprehensive of the state of the sodium-potassium whether in solution and/or suspension.

Having thus described by invention, I claim:

1. In a process for producing ammonia from nitrogen and hydrogen which comprises producing metallic potassium suspension in an electrolytic cell containing electrodes immersed in a fused caustic by passing current therethrough, the step of introducing gases for the ammonia reaction into the cell during the electrolysis and sweeping said gases upward between the electrodes to cause a flow of caustic suspension within the cell, and thus effecting circulation for the reaction and cutting down current consumption by mechanically assisting in the migration of the potassium ion produced by the electrolysis of the caustic.

2. The process of synthesizing ammonia which comprises the following steps: passing an electric current through a fused bath of alkali hydroxide thereby forming free alkali suspended therein, simultaneously introducing nitrogen to form an alkali nitride and reducing the nitride with hydrogen to form ammonia.

3. The process of synthesizing ammonia which comprises passing an electric current through a fused bath of alkali hydroxide thereby forming free alkali suspended therein, and introducing nitrogen and hydrogen into the bath while the current is passing therethrough to form ammonia.

4. The method of producing synthetic ammonia which comprises passing an electric current through a circulating molten bath containing an alkali metal suspended in an alkali hydroxide in a closed electric cell in the presence of reacting gases comprising nitrogen and hydrogen, and removing the ammonia formed.

5. The process set forth in claim 4 in which the molten bath is composed of a potassium caustic potash suspension.

6. The process as set forth in claim 3 in which at least one of the gases is introduced in the cell in close proximity to an electrode to clear the same.

7. The process as set forth in claim 4 wherein at least one of the reacting gases is admixed with a hydrocarbon.

8. The method of producing synthetic ammonia which comprises passing an electric current through a circulating molten bath containing an alkali metal suspended in an alkali hydroxide in a closed electric cell in the presence of reacting gases comprising nitrogen and hydrogen, and withdrawing the alkali caustic suspension without interruption of the reaction.

9. The method of producing synthetic ammonia which comprises passing an electric current through a circulating molten bath containing an alkali metal suspended in an alkali hydroxide in a closed electric cell in the presence of reacting gases comprising nitrogen and hydrogen, forming a nitride suspension in one area of the electric cell and circulating the solution-suspension containing the nitride toward another area of the electric cell, whereby reduction of the nitride is carried out simultaneously with the formation of nitride.

OVID E. ROBERTS, Jr.